March 2, 1954
C. E. HILL
2,670,908
FISHING REEL
Filed Aug. 7, 1948
2 Sheets-Sheet 1
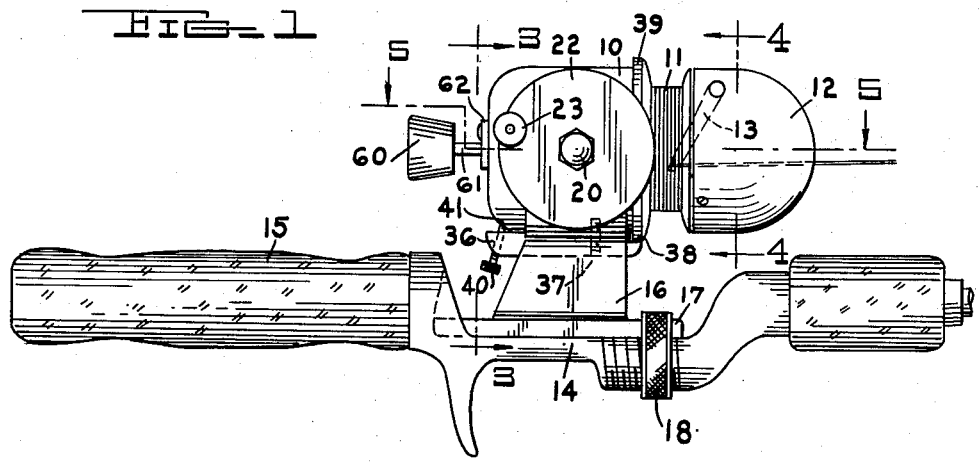
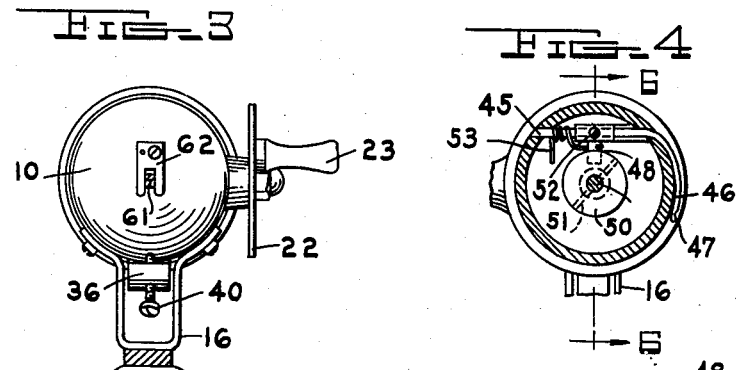
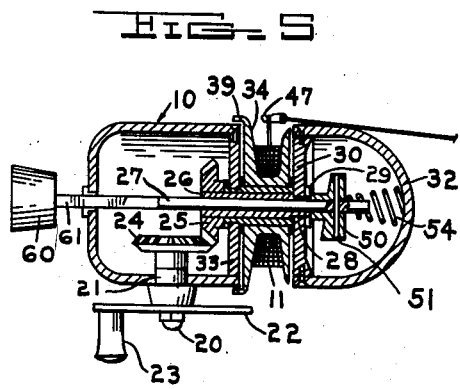
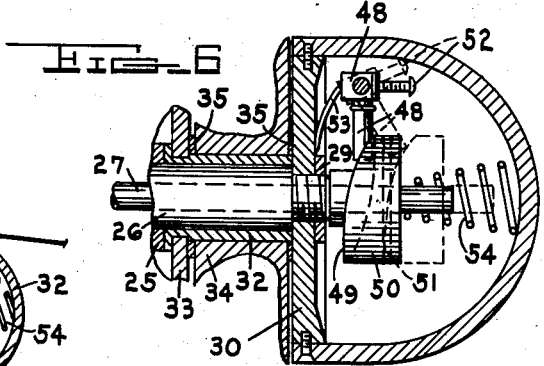
INVENTOR.
CARSON E. HILL
BY
Barnes, Kisselle, Laughlin & Raisch
ATTORNEYS

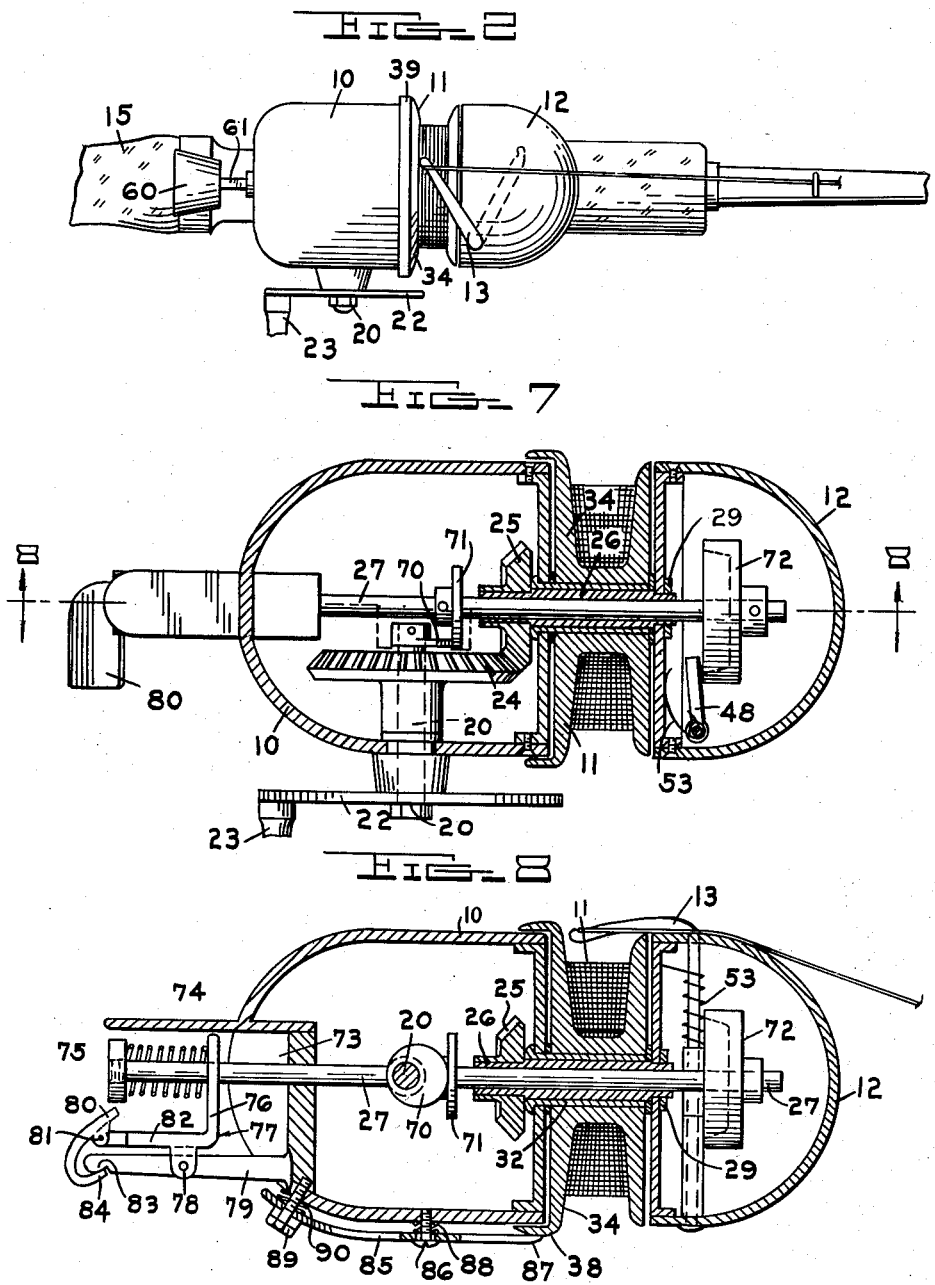

Patented Mar. 2, 1954

2,670,908

UNITED STATES PATENT OFFICE 2,670,908

FISHING REEL

Carson E. Hill, Greenville, Mich.

Application August 7, 1948, Serial No. 43,142

17 Claims. (Cl. 242—84.4)

1

This invention relates to a fishing reel and more particularly to a reel of the type commonly referred to as a "spinning" or "slithering" reel.

It is an object of this invention to produce a reel of this type having a line pick-up finger which is arranged to be actuated to a line engaging position or to a position outside the path of the line by means located on the reel so as to be readily controlled by the operator with the thumb of his hand with which the rod handle is gripped.

The invention also contemplates the provision of a line pick-up finger which is arranged to traverse the line spool when the line is reeled in so as to wind the line smoothly and evenly on the spool.

In the drawings:

Figure 1 is a side elevation of the reel mounted on the handle of a fishing rod.

Figure 2 is a top elevation of the reel with the line pick-up finger rotated to a position 180 degrees from the position shown in Figure 1.

Figure 3 is a sectional view taken along lines 3—3 in Figure 1.

Figure 4 is a sectional view taken along lines 4—4 in Figure 1.

Figure 5 is a sectional view taken along lines 5—5 in Figure 1 showing a cross section of the reel as viewed from the top.

Figure 6 is a fragmentary sectional view taken along lines 6—6 in Figure 4.

Figure 7 is a cross sectional view of a modified form of reel.

Figure 8 is a sectional view taken along lines 8—8 in Figure 7.

Referring to the drawings; the reel comprises a housing 10 which encloses the driving mechanism of the reel, a line spool 11, and a nose housing 12 on which is pivotally mounted a line pick-up finger 13. The reel is arranged to be mounted in the saddle 14 of a fishing rod handle 15 by means of an attaching bracket 16 secured to housing 10 and having end portions 17 adapted to be engaged by suitable fastening members 18 on the rod handle.

Housing 10 is of cylindrical shape and has projecting through its wall at one side a shaft 20 within a bushing 21. Shaft 20 has fixed thereon at its outer end a disc 22 provided with a turning knob 23 and at its inner end shaft 20 is fitted with a bevel gear 24 which meshes with a complementary bevel gear 25. Gear 25 is fixed on one end of a sleeve 26 which is adapted to rotate on a reciprocable shaft 27 extending axially through housing 10. At its outer end sleeve 26

2 is provided with a reduced shoulder portion 28 on which is secured as by a nut 29 an end plate 30 which carries the semi-spherical nose housing 12.

Sleeve 26 is in turn mounted for rotation within a second sleeve 32, the latter being fitted on end plate 33 of housing 10. Sleeve 32 rotatably supports a line spool 34 which extends axially between end plates 30 and 33 and is spaced therefrom by washers 35. Although spool 34 is mounted to rotate freely on sleeve 32, during normal operation of the reel a drag is imposed on spool 34 by means of a brake mechanism. This brake mechanism is in the form of a braking bar 36 pivoted on housing 10 as by a screw 37. Bar 36 is fashioned at its end adjacent spool 34 with a notched toe portion 38 which frictionally engages over a circumferential flange 39 on spool 34. The frictional drag on the spool is controlled by a manual thumb screw 40 threaded into the other end of bar 36 and arranged to bear against housing 10 as at 41.

Pick-up finger 13 is fashioned with a shaft portion 45 and an arcuate hook portion 46. The finger is pivoted on nose 12 with the shaft portion 45 extending through nose 12 on an axis transversely of shaft 27 and with the hook portion 46 overlying the outer surface of nose 12. At its end hook portion 46 is provided with a notched line guide 47. Pick-up finger 13 is arranged to be oscillated when the line is reeled in by means of a dog 48 which rides over the cam surface 49 of a disc 50 fixed on shaft 27 as by a pin 51. Dog 48 is secured on the shaft portion 45 of finger 13 by a screw 52 and is biased against cam surface 49 by means of a torsion spring 53. At the same time disc 50 is urged into engagement with dog 48 and against the threaded end of sleeve 26 by a coil spring 54 acting between the inner surface of nose 12 and the back face of disc 50. Spring 54 is of heavier design than spring 53 so that the dog 48 is positively actuated by the cam surface 49 of disc 50. Thus, as nose 12 is rotated by turning knob 23, dog 48 follows cam surface 49 and oscillates hook portion 46 back and forth across spool 34. Cam surface 49 is designed with a cam rise sufficient to enable the line guide 47 to traverse the spool 34 from end to end so that the line will be distributed evenly on the spool.

When the line is being payed out it is desirable to actuate finger 13 to a position out of the path of travel of the line. For this reason, shaft 27 is extended rearwardly so as to project through the rear end of housing 10, and is provided with a push knob 60. The projecting portion 61 of shaft 27 is non-circular in cross section and the shaft is prevented from rotating relative to housing 10 by means of a guide 62 secured on housing 10 so as to engage the non-circular portion 61 of shaft 27.

When it is desired to pay out line, such as in casting, knob 60 is depressed by the angler with the thumb of his hand with which he is gripping the rod. Shaft 27 and likewise disc 50 are shifted axially forwardly and compress spring 54 so that dog 48 is free to pivot under the influence of spring 53 to the position indicated in broken lines in Figure 6. Dog 48 is prevented from pivoting beyond the position indicated by screw 52 which abuts against the inner surface of nose 12. When dog 48 is released from engagement with cam face 49, shaft portion 45 is likewise rotated and hook portion 46 is shifted forwardly to the position indicated in broken lines in Figure 2. Since hook portion 46 is arcuate in shape, in this position the line guide 47 does not interfere with the line and the line simply slithers off nose 12. When the desired amount of line has been payed out, the angler releases knob 60 and shaft 27 and disc 50 are shifted rearwardly under the influence of spring 54. Dog 48 is thereby engaged and pivoted by cam face 49 so that hook portion 46 swings rearwardly and line guide 47 catches the line and prevents it from unreeling further as is best shown in Figure 2.

When it is desired to reel in line, knob 23 is turned clockwise, as viewed in Figure 1, which through gears 24 and 25 and sleeve 26 produces a counter-clockwise rotation of nose 12. As nose 12 rotates dog 48 is caused to follow cam surface 49 so that finger 13 not only rotates with nose 12 to wind the line on spool 34 but also oscillates back and forth across the spool so as to distribute the line uniformly thereon. If while line is being reeled in a sudden tension is applied to the line, such as by a large fish striking the hook, the frictional drag of brake 36 may be overcome and spool 34 will be rotated by the line in a direction to unreel the line over line guide 47.

In the embodiment shown in Figures 7 and 8 a slightly different form of actuating mechanism for the pick-up finger 13 is illustrated. In this modification an oscillating movement is imparted to the pick-up finger by means of eccentric disc 70 fixed on the inner end of shaft 20 and a flat disc 71 mounted on shaft 27. Disc 71 is arranged to ride against the periphery of cam 70 so as to reciprocate shaft 27 as cam 70 is rotated by knob 23. A cup-shaped disc 72 mounted at the end of shaft 27 within nose 12 engages dog 48 and causes finger 13 to oscillate as the line is reeled in. The rear portion of housing 10 is cut away so as to form a recess 73 in which the releasing mechanism for dog 48 is mounted. This releasing mechanism comprises a compression spring 74 fitted over the portion of shaft 27 projecting into recess 73 and acting between a disc 75 on the end of shaft 27 and one leg 76 of a bell crank 77. Crank 77 is pivoted as at 78 on a support arm 79 which is mounted rigidly on the lower portion of housing 10. A thumb latch 80 pivoted as at 81 at the end of the other leg 82 of crank 77 is shaped with a hook 82 which is arranged to engage in a notch 83 on the underside of arm 79 to maintain spring 77 compressed and disc 71 in contact with cam 70.

With the members in the position shown in Figure 8 shaft 27 is reciprocated by disc 70 when knob 23 is turned and dog 48, which rotates with nose 12, oscillates back and forth since it is biased against the periphery of disc 72 by spring 53. Finger 13 is thereby caused to traverse spool 34 axially and the line is wound evenly on the spool. When it is desired to pay out line, thumb latch 80 is momentarily depressed to disengage hook 82 from notch 83 and then pivoted so that hook 82 will clear the end of arm 79. Latch 80 is then released and crank 77 pivots forwardly under the influence of spring 74 which expands to its free length. Shaft 27 is thereby released and shifted forwardly by spring 53 acting through dog 48. Hook portion 46 of finger 13 is thereby swung forwardly to a position in which it will not interfere with the line as it slithers off nose 12. When sufficient line has been payed out the angler simply depresses latch 80 with his thumb so as to compress spring 74 and shift shaft 27 rearwardly. Dog 48 is thereby pivoted by disc 72 and hook 46 swings rearwardly to catch the line with guide 47 as is shown in Figure 8. If it is desired to maintain pick-up finger 13 in this line engaging position, latch 80 is snapped downwardly so as to engage hook 82 in notch 83.

In Figure 8 there is also shown a slightly modified form of braking arrangement for imposing a drag on spool 34. An arm 85 is loosely mounted on housing 10 by means of a screw 86 so that the bearing end 87 of the arm overlies the peripheral flange 39 of spool 34. A spring 88 is interposed between housing 10 and arm 85 so that the arm bears against the underside of the head of screw 86. A manual adjusting screw 89 passes through the other end of arm 85 and threads into the wall of housing 10. The bearing end 87 of arm 85 is urged against flange 38 by means of a spring 90 which is positioned over screw 89 so as to act between the outer surface of housing 10 and the inner face of arm 85. It will be noted that with this form of braking arrangement the drag on spool 34 can be increased by loosening screw 89 and can be decreased by threading screw further into housing 10.

What I claim is:

1. A fishing reel comprising a support having a front end, a nose member mounted on said front end of said support in an axially fixed position for rotation on an axis extending longitudinally of said support, driving means adjacent the rear end of said support for rotating said nose member, a line receiving spool on said support aligned and fixed axially with respect to said nose member, said spool being located on said support rearwardly of said nose member, said nose member being rotatable relative to said spool, line engaging means on said nose member arranged to engage a line extending axially forwardly from said spool and wind said line on the spool when said nose member is rotated, and means for oscillating said line engaging means on said nose member in a direction axially of the spool when said nose member is rotated so as to distribute the line uniformly on the drum of said spool.

2. A fishing reel comprising a casing, a hollow nose member mounted on said casing for rotation on an axis extending longitudinally of said casing, driving means within the casing for rotating said nose member, a line receiving spool on said casing aligned and fixed axially with respect to said nose member, said nose member and line spool extending from the front end of the casing with the spool disposed rearwardly of the nose member, a line engaging arm pivoted on said nose member for pivotal movement from a position free of a line wound on said spool and extending axially forwardly therefrom to a position overlying the spool wherein said arm engages said line and winds it on the spool when said nose member is rotated, and a reciprocable shaft extending axially through said casing and spool and into said nose member, said shaft being arranged for manual reciprocation for shifting said arm, said manually reciprocable shaft projecting outwardly of said casing adjacent the rear end thereof and being operatively connected with said arm so as to pivot said arm from said line engaging position to said position out of engagement with said line when said shaft is reciprocated.

3. The combination as set forth in claim 2 including spring means for biasing said reciprocable shaft in a direction such that said arm assumes said line engaging position overlying said spool and including finger operable means at the projecting end of said reciprocable shaft for actuating said reciprocable shaft to pivot said arm to said position out of engagement with the line.

4. The combination as set forth in claim 2 including means for oscillating said arm on said nose member in a direction axially of said spool when the nose member is rotated so as to deposit the line uniformly across the drum of said spool.

5. A fishing reel comprising a casing, a hollow nose member mounted on said casing for rotation on an axis extending longitudinally of the casing, driving means within the casing for rotating said nose member, a line receiving spool mounted on said casing adjacent and in alignment with said nose member, said nose member and line spool extending from the front end of the casing with the line spool disposed rearwardly of the nose member, said nose member being rotatable relative to said spool and fixed axially with respect thereto, a line engaging arm pivoted on said nose member and arranged to pick up a line extending axially forwardly from said spool and wind it on the spool when said nose member is rotated, said arm having line guiding means overlying the drum of said spool when in line engaging position and arranged to traverse said spool when said arm is oscillated, a reciprocable spindle extending axially through said casing and spool and into said nose member, means within said nose member operably connecting said spindle with said arm, and cam means interconnecting said driving means and said spindle for reciprocating said spindle and thereby oscillating said arm on said nose member.

6. A fishing reel comprising a casing, a nose member mounted on said casing for rotation on an axis extending longitudinally of the casing, driving means within the casing for rotating said nose member, a line receiving spool mounted on said casing adjacent and in alignment with said nose member, said nose member being rotatable relative to said spool and fixed axially relative thereto, a line engaging arm pivoted on said nose member and arranged to pick up a line extending axially from said spool and wind it on the spool when said nose member is rotated, said arm having line guiding means overlying the drum of said spool and arranged to traverse said spool when said arm is oscillated, a reciprocable spindle extending longitudinally of said casing, cam means associated with said driving means for reciprocating said spindle when said nose member is rotated, a dog member on said arm arranged to be actuated by said spindle and to oscillate said arm on said nose member when said spindle is reciprocated.

7. The combination as set forth in claim 6 wherein said arm is arranged to pivot on said nose member to a position out of engagement with said line and including means for shifting said spindle axially of said casing for pivoting said arm to said line disengaging position.

8. A fishing reel comprising a casing, a nose member mounted on said casing for rotation on an axis extending longitudinally of the casing, driving means within the casing for rotating said nose member, a line receiving spool on said casing mounted adjacent and in alignment with said nose member, said nose member and line spool being mounted at the front end of said casing with the line spool disposed rearwardly of the nose member, said nose member being rotatable and fixed axially relative to said spool, a line engaging arm pivoted on said nose member for movement to a line engaging position wherein an end of said arm is arranged to pick up a line extending axially from said spool and wind it on the spool when the nose member is rotated and to a second position wherein said end of the arm is spaced axially forwardly from said first position and disposed free of said line, a spindle slidable forwardly and rearwardly in said casing, said spindle extending axially through said line spool and into said nose member and operatively connected with said arm so as to pivot said arm when the spindle is shifted axially, spring means biasing such spindle in a forward direction to pivot said arm to said position free of the line, and finger operable latch means on said casing arranged to releasably lock said spindle in a rearward position corresponding to the line engaging position of said arm.

9. A fishing reel comprising a casing, a nose member mounted on said casing for rotation on an axis extending longitudinally of the casing, driving means within the casing for rotating said nose member, a line receiving spool on said casing mounted adjacent and in alignment with said nose member, said nose member being fixed axially and being rotatable relative to said spool, a line engaging arm pivoted on said nose member for movement to a line engaging position wherein an end of said arm is arranged to pick up a line extending axially from said spool and wind it on the spool when the nose member is rotated and to a second position wherein said end of the arm is spaced axially from said first position and disposed free of said line, a spindle slidable forwardly and rearwardly in said casing and operatively connected with said arm so as to pivot said arm when the spindle is shifted axially, spring means biasing such spindle in a forward direction to pivot said arm to said position free of the line, and finger operable latch means on said casing arranged to releasably lock said spindle in a rearward position corresponding to the line engaging position of said arm, and including means at said end of said arm for guiding the line on said spool, said line guiding means in the line engaging position of said arm overlying the spool and arranged to traverse the axis of the spool when said arm is oscillated, and means associated with said driving means for reciprocating said spindle so as to oscillate said arm on said nose member in the line engaging position whereby said line guiding means distribute the line uniformly on said spool.

10. A fishing reel comprising a casing, a nose member mounted on said casing in an axially fixed position for rotation on an axis extending longitudinally of the casing, driving means within the casing for rotating said nose member, a line receiving spool on said casing having its axis aligned with the axis of rotation of said nose member, said nose member being axially fixed with respect to said spool, said nose member and line spool extending from the front end of the casing with the line spool disposed rearwardly of said nose member, line engaging means on said nose member shiftable in a generally rearwardly direction from a position out of engagement with a line wound on said spool and extending axially forwardly therefrom to a position engaging said line, said line engaging means when in the line engaging position having a line guiding portion overlying the drum of said spool, and means for oscillating said line engaging means on said nose member when said nose member is rotated so that said line guiding portion traverses the drum of said spool to deposit the line evenly thereon.

11. The combination as set forth in claim 10 including spring means for biasing said line engaging means to said line engaging position.

12. A fishing reel comprising a casing, a hollow nose member mounted on said casing for rotation on an axis extending longitudinally of said casing, driving means within the casing for rotating said nose member, a line receiving spool on said casing aligned and fixed axially with respect to said nose member, said nose member and line spool extending from the front end of said casing with the line spool disposed rearwardly of said nose member, a line engaging arm on said nose member having a line guide thereon, said arm being actuatable to shift said line guide axially of said spool from a position free of a line wound on said spool and extending axially forwardly therefrom to a rearward position overlying the spool wherein said guide engages said line and winds it on the spool when said nose member is rotated, an axially reciprocable spindle extending axially of said casing, spool and nose member and projecting beyond said casing adjacent the rear end thereof, finger operable means on the projecting end of said spindle for effecting axial movement of said spindle, means within said nose member operably connecting said spindle and said line engaging arm for shifting said guide axially rearwardly and forward, respectively, to and from said line engaging position when said spindle is reciprocated by the actuation of said finger operable means, and including means for oscillating said arm on said nose member when said nose member is rotated by said driving means to cause said line guide to traverse said spool axially and thereby wind the line evenly on the drum of said spool.

13. The combination set forth in claim 1 wherein said support comprises a casing and said line engaging means comprises an arm pivoted on said nose member, said arm having means thereon for guiding the line axially of the spool as it is wound thereon, said means for oscillating said arm including means providing a cam surface disposed transversely of the axis of rotation of said nose member and a dog on said arm arranged to be actuated by said cam surface so that said line guiding means transverses the axis of the spool and deposits the line evenly thereon when the nose member is rotated.

14. The combination as set forth in claim 13 including spring means for biasing said dog and said cam means to interengage and means for shifting said cam means axially of said nose member to permit said arm to pivot on said nose member to a position free of the line.

15. The combination set forth in claim 1 wherein said support comprises a casing and said line engaging means comprises an arm pivoted on said nose member, said arm having means thereon for guiding the line axially of the spool as it is wound thereon, said oscillating means including a reciprocable spindle extending longitudinally of the said casing through the axis of said nose member, a cam member on said spindle, means on said arm arranged to be actuated by said cam member for oscillating said arm when the nose member is rotated and means for shifting said spindle axially of said nose member to permit said arm to pivot to a position out of engagement with said line.

16. The combination set forth in claim 1 wherein said support comprises a casing and said line engaging means comprises an arm pivoted on said nose member for movement to a line engaging position wherein the arm is arranged to pick up a line extending axially forwardly from the spool and wind it on the spool when the nose member is rotated and to a second position wherein the arm is disposed free of said line, said arm having line guiding means thereon which in the line engaging position of said arm overlie the drum of said spool, said means for oscillating said arm including a reciprocable spindle extending longitudinally of said casing, a cam member on said spindle, a dog member on said arm biased into engagement with said cam member and arranged to be actuated by said cam member for oscillating the arm when the nose member is rotated so that said line guiding means transverses the axis of the spool and deposits the line evenly on said spool, said spindle being arranged to project outwardly of said casing at the rear end thereof and finger operable means at the projecting end of said spindle for shifting said spindle and cam member axially of said nose member to permit said arm to pivot to said second position free of said line.

17. The combination as set forth in claim 16 wherein said arm is arranged to pivot to said second position when said spindle is shifted forwardly and including a spring means for biasing said spindle rearwardly whereby said arm is biased to said line engaging position.

CARSON E. HILL.

References Cited in the file of this patent

UNITED STATES PATENTS

| Number | Name | Date |
|---|---|---|
| 2,344,209 | Lowe | Mar. 14, 1944 |
| 2,492,587 | Ledingham | Dec. 27, 1949 |
| 2,584,020 | Humphreys | Jan. 29, 1952 |

FOREIGN PATENTS

| Number | Country | Date |
|---|---|---|
| 22,597 of 1907 | Great Britain | June 11, 1908 |
| 49,548 | France | Jan. 23, 1939 |
| | (Addition to No. 828,000) | |
| 889,493 | France | Oct. 4, 1943 |
| 894,625 | France | Mar. 20, 1944 |